United States Patent [19]
Risetter

[11] Patent Number: 5,921,627
[45] Date of Patent: Jul. 13, 1999

[54] AUTOMATIC HUNTER'S PROP

[76] Inventor: Ronald D. Risetter, 54 Broken Bow Ridge, Waynesville, N.C. 28786

[21] Appl. No.: 09/157,863

[22] Filed: Sep. 21, 1998

[51] Int. Cl.⁶ .................................................. A47C 16/00
[52] U.S. Cl. .......................... 297/293; 5/634; 297/354.13
[58] Field of Search .................................... 297/285, 291, 297/292, 293, 294, 295, 354.13, 377, DIG. 11; 5/633, 634

[56] References Cited

U.S. PATENT DOCUMENTS

| | | |
|---|---|---|
| 1,347,748 | 7/1920 | Lytwyner ............................ 297/377 X |
| 3,220,766 | 11/1965 | Kates . |
| 3,232,664 | 2/1966 | McBride . |
| 3,799,608 | 3/1974 | Smutny et al. . |
| 4,458,370 | 7/1984 | Fichler .................................... 5/634 X |
| 5,345,630 | 9/1994 | Healy ..................................... 5/634 X |
| 5,673,966 | 10/1997 | Morton, Jr. . |
| 5,695,099 | 12/1997 | Strum . |

FOREIGN PATENT DOCUMENTS

| | | | |
|---|---|---|---|
| 60898 | 5/1943 | Denmark ............................... 297/292 |
| 97443 | 6/1898 | United Kingdom ........................ 5/634 |
| 160220 | 3/1921 | United Kingdom ........................ 5/634 |

OTHER PUBLICATIONS

Cabela's Fall 98 Catalog; "Sitting Goose Blind"; p. 343; Published prior to Sep. 21, 1998.

*Primary Examiner*—Peter R. Brown
*Attorney, Agent, or Firm*—Adams Law Firm, P.A.

[57] ABSTRACT

An automatic hunter's prop is adapted for quickly lifting a hunter lying on his back in a camouflage position to a ready position for shooting game. The hunter's prop includes a base frame for being positioned on a ground surface, and a launching frame connected to the base frame. The launching frame is pivotable between a tension-loaded condition wherein the launching frame extends generally parallel to the base frame, and a tension-released condition wherein the launching frame extends upwardly at an angle to the base frame. A pair of coiled springs increase tension in the launching frame when moved from the tension-released condition to the tension-loaded condition. A releasible catch and hook cooperate to releasibly set the launching frame in the tension-loaded condition. A trigger cord releases the catch from the hook and rapidly pivots the launching frame upwardly into the tension-released condition. The hunter lying on the prop is quickly lifted upwardly by the launching frame from the camouflage position to the ready position for shooting game.

10 Claims, 6 Drawing Sheets

AUTOMATIC HUNTER'S PROP

TECHNICAL FIELD AND BACKGROUND OF THE INVENTION

This invention relates to an automatic hunter's prop used for quickly lifting a hunter from a camouflage position lying on his back to a seated, ready position for shooting game. The invention is especially applicable for waterfowling, and may be used in combination with a lightweight decoy shell and other camouflage common in the industry. The invention is relatively inexpensive to manufacture, lightweight, and convenient to carry.

According to one prior art goose blind, a foldable chair supports the hunter in a semi-reclined seated position and includes a lightweight decoy shell which pivotably attaches to the chair back for covering the head, shoulders, and chest of the hunter. The decoy shell has large window slots for viewing. When waterfowl are spotted overhead, the hunter quickly flips the decoy shell upwardly and out of the way for shooting. This prior art blind addresses a need in the industry for a way to hunt in open grain fields or on frozen lakes without digging a pit and without lying flat on cold wet ground. However, because the hunter waits seated in the blind prior to shooting, he is in a less effective camouflage position and has a limited range of view overhead. Moreover, the prior art blind generally requires the use of a large decoy shell which can be cumbersome to manipulate and difficult to carry.

The present invention addresses these and other problems of the prior art by providing a hunter's prop which automatically lifts the hunter from a camouflage position lying on his back to a ready position for shooting. In the camouflage position, the hunter has full view of the sky overhead and is able to precisely time his launch into the shooting position when spotting waterfowl. The invention is conveniently triggered by the hunter, and includes a safety mechanism to prevent an inadvertent launch.

SUMMARY OF THE INVENTION

Therefore, it is an object of the invention to provide an automatic hunter's prop which is especially adapted for use by waterfowlers.

It is another object of the invention to provide an automatic hunter's prop which is relatively lightweight.

It is another object of the invention to provide an automatic hunter's prop which is convenient to carry.

It is another object of the invention to provide an automatic hunter's prop which is relatively inexpensive to manufacture.

It is another object of the invention to provide an automatic hunter's prop which quickly lifts a hunter from a lying position to a seated position when triggered by the hunter.

It is another object of the invention to provide a method of automatically lifting a hunter from a camouflage position to a ready position for shooting game.

These and other objects of the present invention are achieved in the preferred embodiments disclosed below by providing an automatic hunter's prop adapted for quickly lifting a hunter lying on his back in a camouflage position to a ready position for shooting game. The hunter's prop includes a base frame for being positioned on a ground surface. A launching frame is connected to the base frame, and is pivotable between a tension-loaded condition wherein the launching frame extends generally parallel to the base frame, and a tension-released condition wherein the launching frame extends upwardly at an angle to the base frame. Biasing means are provided for increasing tension in the launching frame when moved from the tension-released condition to the tension-loaded condition. Releasible setting means releasibly sets the launching frame in the tension-loaded condition. Trigger means releases the setting means and rapidly pivots the launching frame upwardly into the tension-released condition. The hunter lying on the prop is thereby quickly lifted upwardly by the launching frame from the camouflage position to the ready position for shooting game.

According to one preferred embodiment of the invention, the setting means includes a pivoted catch attached to a mounting plate fixed to the base frame. The pivoted catch releasibly engages a hook attached to the launching frame for holding the launching frame in the tension-loaded condition.

According to another preferred embodiment of the invention, the releasible setting means further includes a pivoted safety attached to the mounting plate adjacent the catch for preventing premature release of the catch from the hook.

According to yet another preferred embodiment of the invention, the releasible setting means further includes a removable locking pin extending through aligned openings formed through the mounting plate and the safety to prevent movement of the safety and catch. The pin and safety cooperate to lock the launching frame in the tension-loaded condition.

According to yet another preferred embodiment of the invention, the trigger means is a pull cord attached to the catch for disengaging the catch and the hook.

According to yet another preferred embodiment of the invention, the pull cord includes a foot loop adapted for extending around the foot of the hunter.

According to yet another preferred embodiment of the invention, a head pad is attached to the launching frame for cushioning the head of the hunter upon movement of the launching frame from the tension-loaded condition to the tension-released condition.

According to yet another preferred embodiment of the invention, a shoulder strap is attached to the prop for convenient carrying.

According to yet another preferred embodiment of the invention, the biasing means includes a pair of coiled springs interconnecting the base frame and the launching frame.

The invention further includes a method for quickly lifting a hunter lying on his back in a camouflage position to a ready position for shooting game. The method includes the step of positioning an automatic hunter's prop on a ground surface. The hunter's prop includes a base frame and a launching frame. The launching frame is moved from a tension-released condition wherein the launching frame extends upwardly at an angle to the base frame to a tension-loaded condition wherein the launching frame extends generally parallel to the base frame. The launching frame is releasibly locked in the tension loaded condition. With the hunter lying in the camouflage position on the prop, the launching frame is released by the hunter from the tension-loaded condition for upward pivoting movement of the launching frame into the tension-released condition. The hunter is thereby quickly lifted upwardly by the launching frame from the camouflage position to the ready position for shooting game.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
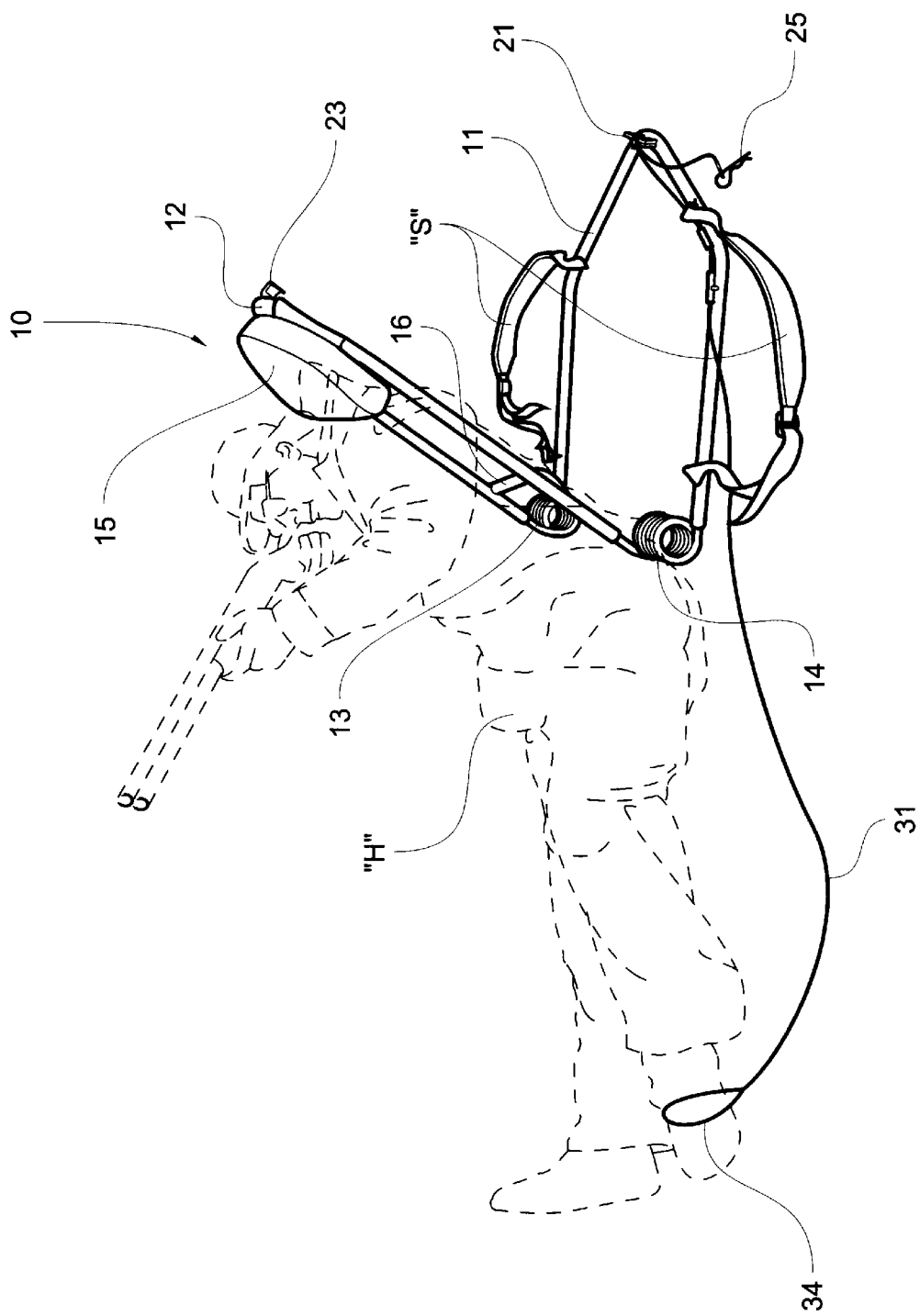
FIG. 1 is a perspective view the hunter's prop according to one preferred embodiment of the invention, and showing a hunter in phantom in a seated, ready position for shooting game.
Figure 2:
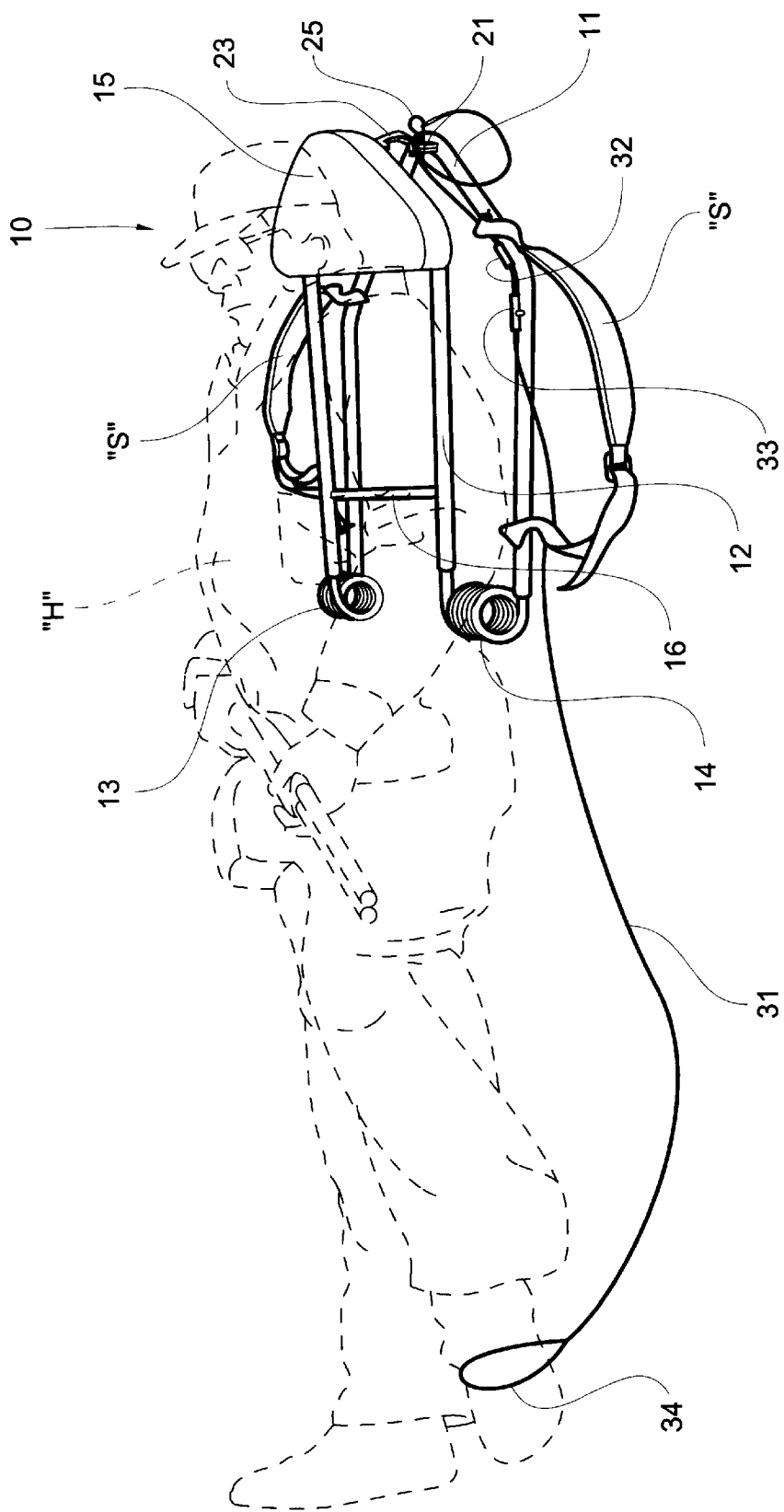
FIG. 2 is a perspective view of the hunter's prop in a loaded condition with the hunter shown in phantom in a camouflage position lying on his back.

Referring now specifically to the drawings, an automatic hunter's prop according to the present invention is illustrated in FIG. 1 and shown generally at reference numeral 10. The hunter's prop 10 is used for quickly lifting a hunter "H" lying on his back in a camouflage position, shown in FIG. 2, to a seated ready position, shown in FIG. 1, for shooting game. The hunter's prop 10 is particularly applicable for hunting waterfowl, and may be used in combination with a lightweight decoy shell and other camouflage common in this industry. In addition, shoulder straps "S" may be provided for conveniently carrying the hunter's prop 10.

Figure 3:
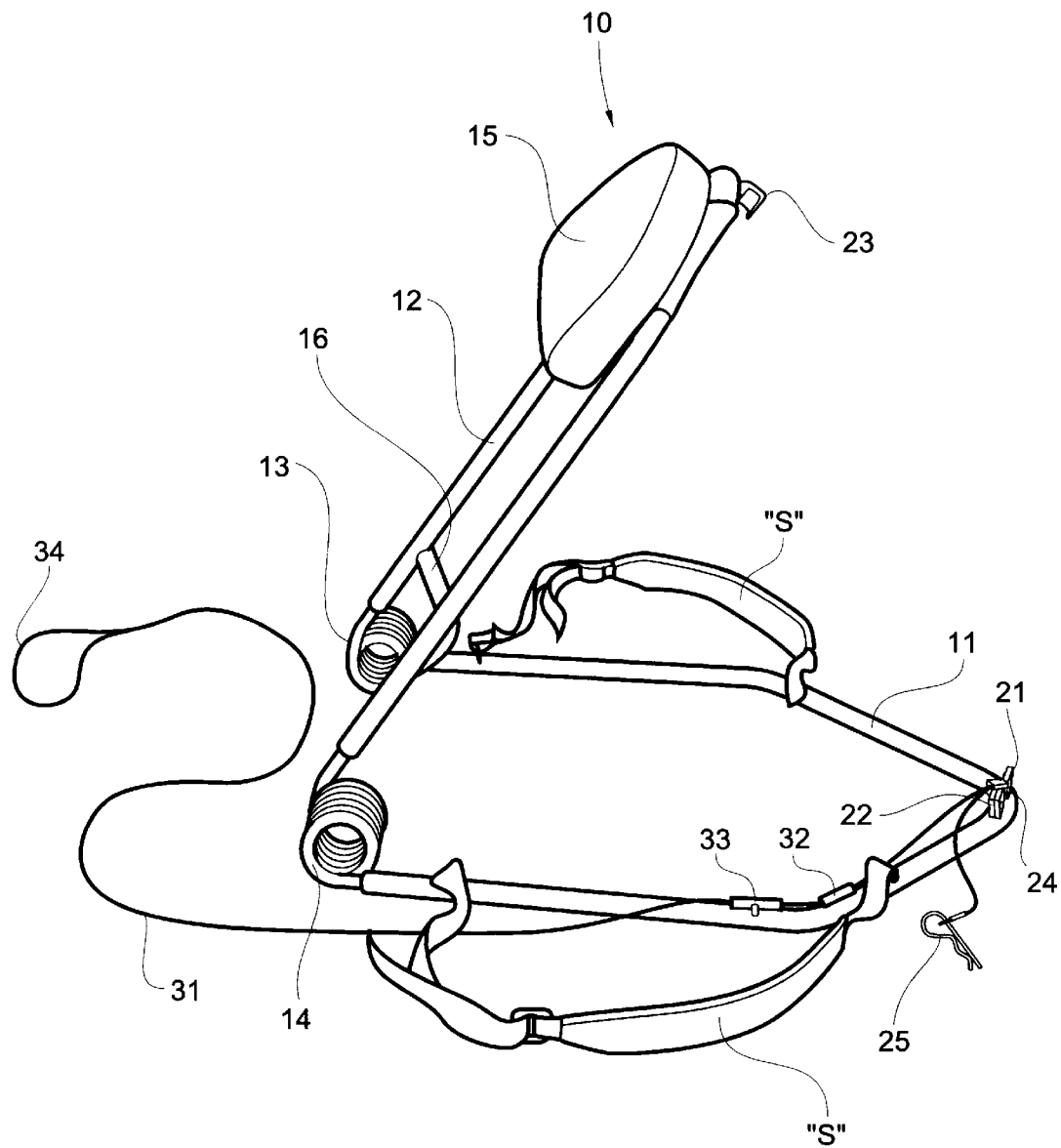
FIG. 3 is a perspective view of the hunter's prop in a tension-released condition.
Figure 4:
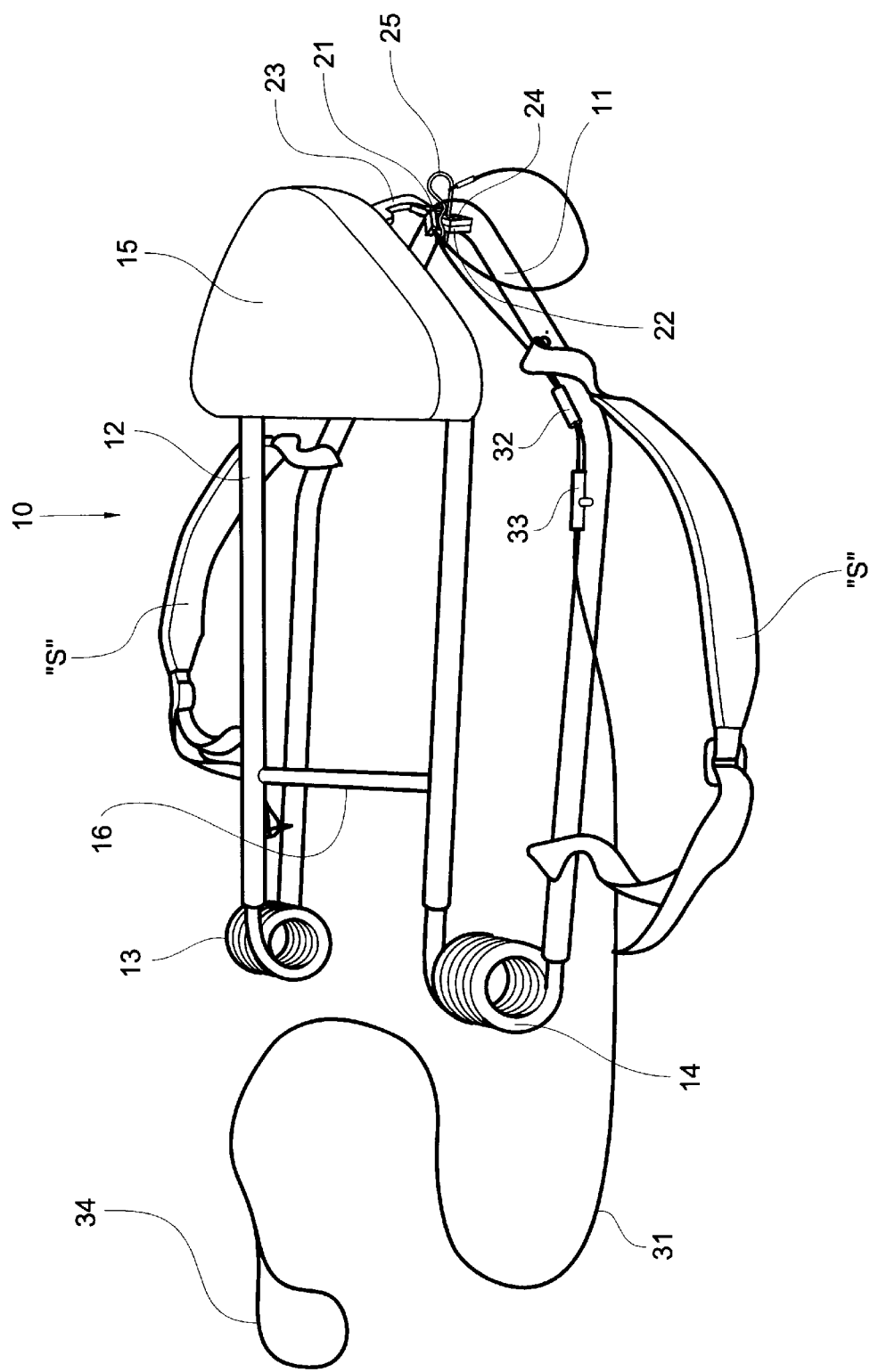
FIG. 4 is a perspective view of the hunter's prop in the loaded condition.

Referring to FIGS. 3 and 4, the hunter's prop 10 is formed of a metal base frame 11 and launching frame 12 attached to opposite ends of respective, laterally spaced, steel coiled springs 13 and 14. The base frame 11 is positioned by the hunter on a flat ground surface, and is preferably bent in a generally U-shape or V-shape for increased stability. The launching frame 12 is formed in a shape corresponding to the base frame, and includes a head pad 15 for engaging and cushioning the head of the hunter "H" and a lateral support bar 16 for engaging the back. In a normal, generally tension-free condition, the launching frame 12 extends upwardly at an angle to the base frame 11, as shown in FIG. 3. The springs 13 and 14 provide sufficient resistance to support the hunter "H" in the ready position for shooting (See FIG. 1).

As shown in FIG. 4, the hunter's prop 10 is manually set by pivoting the launching frame 12 downwardly towards the base frame 11 and against the increasing biasing force of the springs 13 and 14. A pivoted catch 21 is attached to a mounting plate 22 fixed to the base frame 11, and cooperates with a hook 23 attached to the launching frame 12 to releasibly hold the launching frame 12 in the tension-loaded condition. A pivoted safety 24 is attached to the mounting plate 22 adjacent the catch 21 to prevent inadvertent, premature release of the catch 21 from the hook 23. Once the launching frame 12 is set, a removable locking pin 25 is inserted through aligned openings 26 and 27 (See FIG. 7) formed in the safety 24 and the mounting plate 22 to lock the safety 24 in position, as best shown in FIG. 5, while the hunter "H" positions himself on the prop 10.

A pull cord 31 is attached to the pivoted catch 21 and extends through guide sleeves 32 and 33 on the base frame 11 to an area near the foot of the hunter "H". A foot loop 34 is formed at the free end of the pull cord 31 and is adapted for being placed around the foot of the hunter "H". With the foot loop 31 attached, the hunter "H" moves into the camouflage position shown in FIG. 2.

Figure 5:
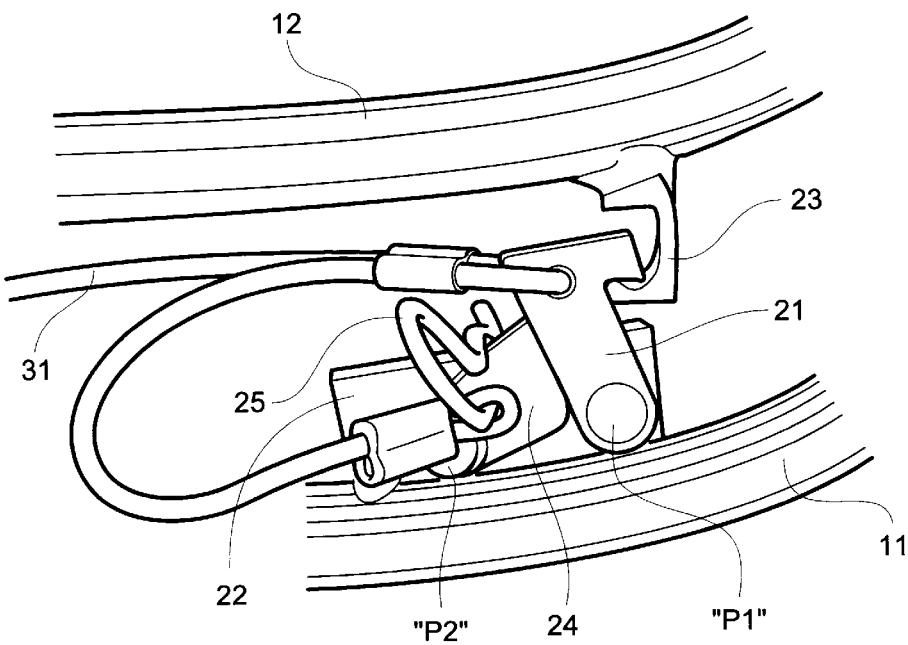
FIG. 5 is a fragmentary perspective view of the hunter's prop showing the catch and hook assembly for holding the launching frame in the tension-loaded condition, and showing the safety locked in position by the locking pin.
Figure 6:
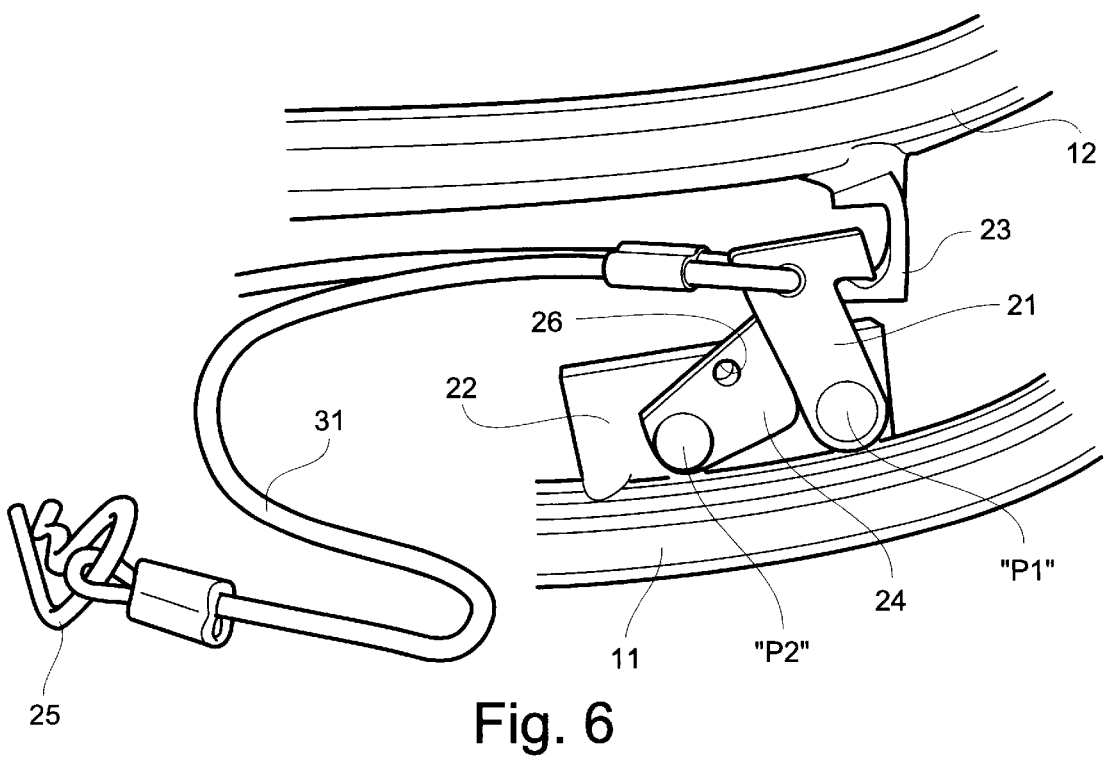
FIG. 6 is a fragmentary perspective view of the hunter's prop showing the catch and hook assembly with the locking pin removed.
Figure 7:
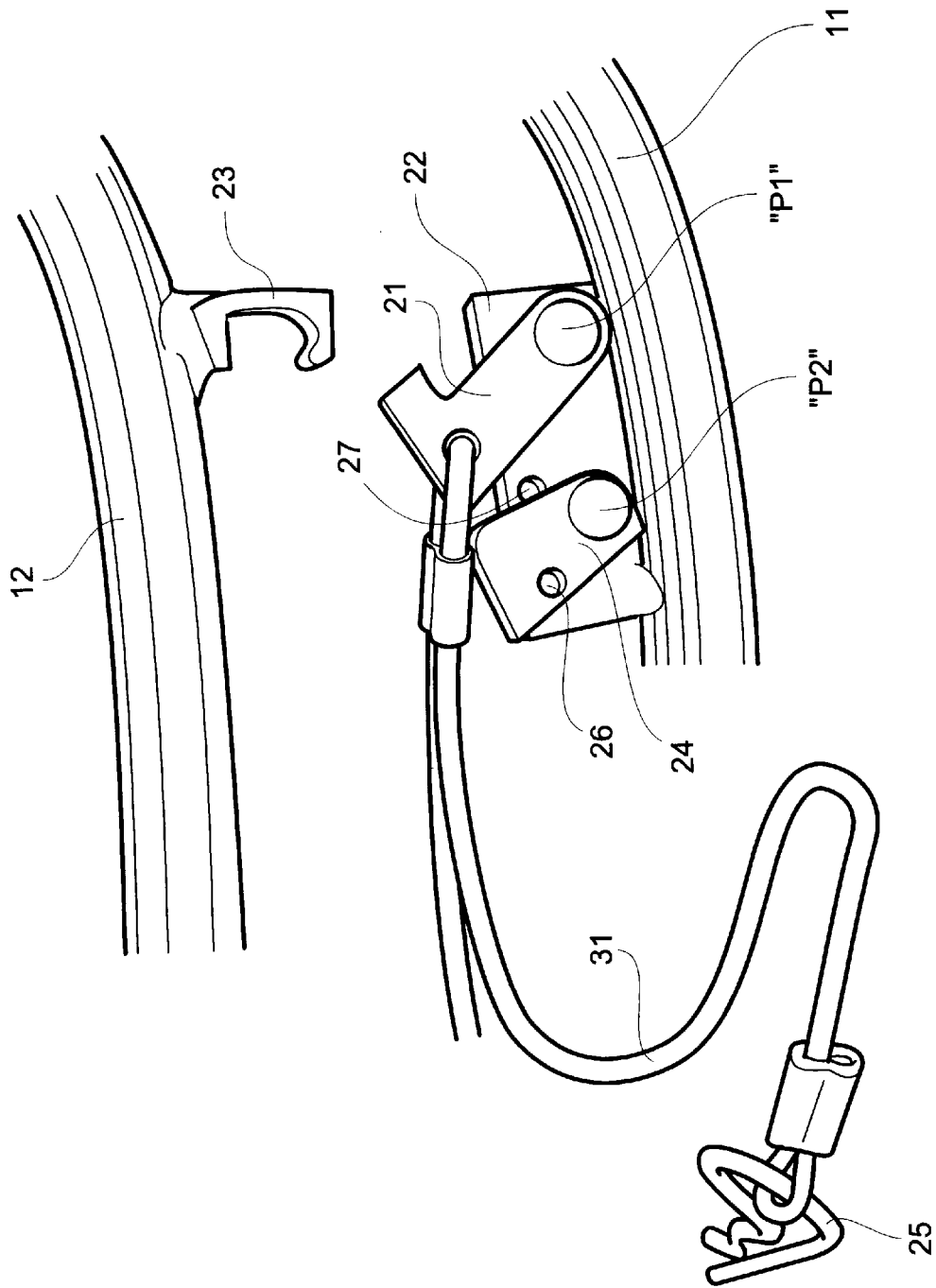
FIG. 7 is a fragmentary perspective view of the hunter's prop showing the catch and hook assembly with the catch disengaged from the hook to release the launching frame.

Referring to FIGS. 5–7, once comfortably positioned on the prop 10, the hunter "H" removes the locking pin 25 from the safety 24 and mounting plate 22 and waits patiently with rifle in hand for the proper time to begin shooting. For convenience, the locking pin 25 is preferably secured to an end of the pull cord 31 near the catch 21. When waterfowl are spotted overhead, the hunter "H" kicks his foot away from the prop 10 causing the pull cord 31 to pivot the catch 21 rearwardly about point P1. The catch 21 bears against the safety 24 causing the safety 24 to pivot rearwardly about point P2. As the catch 21 and hook 23 disengage, as shown in FIG. 7, the coiled springs 13 and 14 rapidly pivot the launching frame 12 upwardly to lift the hunter "H" from the camouflage position to the ready position for shooting.

An automatic hunter's prop is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

claim:

1. An automatic hunter's prop adapted for quickly lifting a hunter lying on his back in a camouflage position to a ready position for shooting game, said hunter's prop comprising:

(a) a base frame for being positioned on a ground surface;
   (b) a launching frame connected to said base frame, and pivotable between a tension-loaded condition wherein said launching frame overlays and extends generally parallel to said base frame, and a tension-released condition wherein said launching frame extends upwardly at an angle to said base frame;
   (c) biasing means interconnecting said base frame and said launch frame for increasing tension in said launching frame when moved from the tension-released condition to the tension-loaded condition;
   (d) releasible setting means for releasibly setting said launching frame in the tension-loaded condition; and
   (e) trigger means for releasing said setting means and rapidly pivoting said launching frame upwardly into the tension-released condition, whereby the hunter lying on said prop is quickly lifted upwardly by said launching frame from the camouflage position to the ready position for shooting game.

2. A hunter's prop according to claim 1, wherein said releasible setting means comprises a pivoted catch attached to a mounting plate fixed to said base frame, said pivoted catch releasibly engaging a hook attached to said launching frame for holding said launching frame in the tension-loaded condition.

3. A hunter's prop according to claim 2, wherein said releasible setting means further comprises a pivoted safety attached to said mounting plate adjacent said catch for preventing premature disengaging of said catch and said hook.

4. A hunter's prop according to claim 3, wherein said releasible setting means further comprises a removable locking pin extending through aligned openings formed through said mounting plate and said safety to prevent movement of said safety and catch, thereby locking said launching frame in the tension-loaded condition.

5. A hunter's prop according to claim 2, wherein said trigger means comprises a pull cord attached to said catch for disengaging said catch and said hook.

6. A hunter's prop according to claim 5, wherein said pull cord includes a foot loop adapted for extending around the foot of the hunter.

7. A hunter's prop according to claim 1, and comprising a head pad attached to said launching frame for cushioning the head of the hunter upon movement of the launching frame from the tension-loaded condition to the tension-released condition.

8. A hunter's prop according to claim 1, and comprising a shoulder strap attached to said base frame for conveniently carrying said prop.

9. A hunter's prop according to claim 1, wherein said biasing means includes a pair of coiled springs interconnecting said base frame and said launching frame.

10. A method for quickly lifting a hunter lying on his back in a camouflage position to a ready position for shooting game, said method comprising the steps of:

(a) positioning an automatic hunter's prop on a ground surface, the hunter's prop including a base frame and a launching frame interconnected by a biasing means;

(b) moving the launching frame from a tension-released condition wherein the launching frame extends upwardly at an angle to the base frame to a tension-loaded condition wherein the launching frame overlays and extends generally parallel to the base frame;

(c) releasibly locking the launching frame in the tension-loaded condition; and (d) with the hunter lying in the camouflage position on the prop, releasing the launching frame from the tension-loaded condition for upward pivoting movement of the launching frame into the tension-released condition, whereby the hunter is quickly lifted upwardly by the launching frame from the camouflage position to the ready position for shooting game.

* * * * *